Aug. 26, 1969     W. A. BIRCHER     3,463,902
WELDING GUN
Filed Aug. 25, 1966
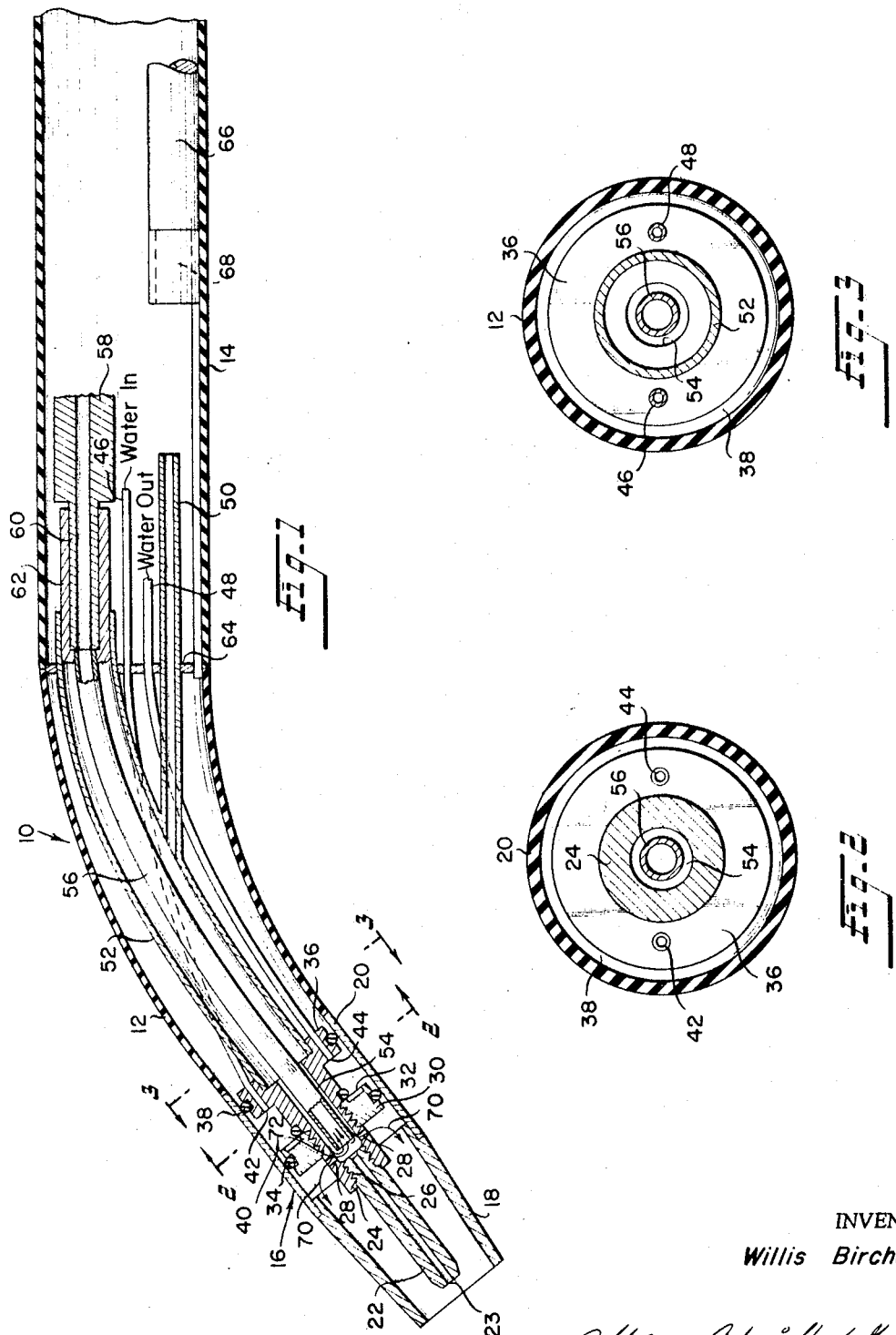
INVENTOR
Willis Bircher
BY Schlesinger, Arkwright & Garvey
ATTORNEYS

United States Patent Office

3,463,902
Patented Aug. 26, 1969

3,463,902
WELDING GUN
Willis A. Bircher, Box 195, Dunkard, Pa. 15328
Filed Aug. 25, 1966, Ser. No. 575,023
Int. Cl. B23k 9/00
U.S. Cl. 219—130    7 Claims

ABSTRACT OF THE DISCLOSURE

An electric arc welding gun for use with a consumable electrode comprising a barrel having a nozzle at one terminal, a gas conveying tube within the barrel, an electrode guiding tube within, and in spaced relation to, the walls of said gas conveying tube, a tubular nozzle portion connected to a terminal of the gas conveying tube and spaced from the electrode guiding tube to permit passage of the gas therebetween, a pair of spaced flanges extending outwardly from the nozzle portion into sealing engagement with the barrel to form a cooling chamber, inlet and outlet openings in one of the flanges for admitting a cooling fluid to the cooling chamber, a contact tip having a bore through which an electrode passes, connected to the terminal of the nozzle portion, the contact tip being proximate, but spaced from, a terminal of the electrode guiding tube to provide a space into which gas from the gas conveying tube passes, a back pressure of gas being created in the electrode guiding tube to prevent air from entering the nozzle area through the electrode guiding tube.

---

This invention relates to welding guns, and more particularly to welding guns utilizing a consumable electrode.

Two basic problems exist in the consumable electrode welding gun art. First, there is the problem of adequate cooling of the contact tip. Secondly, there is the problem of air entering through the electrode guiding means into the area adjacent the nozzle.

A problem existing in prior art welding guns is that the cooling fluid is not conveyed to a chamber located close enough to the nozzle and work area to provide adequate cooling.

Prior art devices have shown that unacceptable welds have been produced because atmospheric gas carried through the gun by the consumable electrode has contaminated the arc plasma. This deterioration of the gas shield produces unacceptable irregularities in the arc and the weld itself. It has been attempted to provide bleeder means in the gas line to force gas to flow down the consumable electrode guiding means. However, this gas merely mixes with the air which is not completely stopped from entering through the guiding means. This is therefore only a partial correction of the problem.

It is one object of the invention to provide a cooling chamber adjacent the gas nozzle and contact tip.

It is another object to provide a cooling means in direct heat-conductive contact with the gas nozzle. While some prior art devices have located the cooling chamber adjacent the nozzle, the cooling means is not in direct heat contact with the nozzle, but is in heat conductive contact only at a point remote from the nozzle.

By providing the cooling adjacent the gas nozzle it has been found that much higher currents can be used with a smaller gun. Further, the welding gun can be used in both short arc and spray arc processes. This is because in view of the simplicity and the size of the gun, together with the varying capacity of current, the same gun can be easily utilized and manipulated as opposed to the prior art welding guns.

It is another object to provide means for preventing air from entering the area around the nozzle through the electrode guide means.

It is still a further object to provide a back-pressure in the electrode guide means to prevent air from entering. The back-pressure is generated by means of the gas being fed to the nozzle.

Summary

In general the invention includes an arc welding gun for use with a consumable electrode, and comprises a barrel with a nozzle positioned at one end. There is included means for guiding the electrode through the barrel and through the nozzle area. Gas is conveyed through the barrel to the nozzle, as is a cooling fluid which is conveyed to and surrounds the nozzle. Finally, there is means for preventing air from entering the area around the nozzle. This means includes the provision of a back-pressure of gas on the opening through which the electrode is guided.

Other objects and advantages will become apparent and the invention will be better understood from the following description of one specific embodiment taken in connection with the accompanying drawings wherein:

FIGURE 1 is a cross sectional side elevation view of the welding gun of the instant invention;

FIGURE 2 is a cross-section view taken along lines 2—2 of FIGURE 1;

FIGURE 3 is a cross-section view taken along lines 3—3 in FIGURE 1.

Detailed description

Referring now to the drawings, a welding gun according to the instant invention is seen generally at 10. The gun includes a barrel having a forward portion 12 and a rearward portion 14. At the forward end of the barrel is included a nozzle assembly generally seen at 16.

The nozzle assembly 16 generally includes a shielding skirt 18 to which is attached a tubular member 20, which in turn is an extension on the forward barrel 12. Within the skirt 18 is positioned a contact tip 22 having an opening 23 therethrough. The contact tip 22 is threadably engaged at 26 with a main nozzle portion 24. The nozzle has a plurality of gas outlet openings 28.

Also threadably secured to the main nozzle portion 24 is a first flange member 30 which may have an annular recess 32 therein. To provide sealing contact between the flange 30 and the tubular member 20, there is located an annular ring seal 34. Secured to the other end of the main nozzle portion 24 is a second flange 36 having a similar seal 38 thereon.

Between the two flanges is a cooling chamber 40. Communicating with the cooling chamber 40 is an inlet opening 42 in flange 36 and in outlet opening 44. The cooling fluid is conveyed into the chamber through inlet 42 from a fluid conveying means in the form of tube 46. The water is exhausted from the chamber through opening 44 into an outlet tube 48, the tubes 46 and 48 being connected to a suitable pump and cooling means.

Positioned within the barrel is a gas inlet or gas conveying means in the form of a tube 50 which carries gas into an annular chamber 52 which terminates in another annular chamber 54 communicating with the nozzle outlet 28.

Also positioned within the annular space 52 is a tubular guiding means for the electrode seen at 56. This in turn communicates with a larger conduit 58 in the barrel portion 14. The conduit 58 has an annular male portion 60 which is received in a cooperating female portion 62 in a support member 64 which in turn supports the guide means 56 and the various gas and water conveying means.

Electrical power is provided to the welding gun by means of a cable 66 which is inserted in a cable-receiving bracket 68.

The flange member 30 may be of a brass or of a heat-resistant plastic, depending upon the current to be applied to the gun and also depending upon the type of work to be welded.

The gas passing through nozzle openings 28 is seen by the arrows 70; while gas forced into the guide means, as will be discussed below, is seen by arrows 72.

Operation

The consumable electrode is inserted through the conduit 58 and into the guiding means 56. From there it is fed through the contact tip 22 via the opening 23.

The gas is forced in through gas conveying means 50 and into the annular tubular shaped member 52, through conduits 54 and out through the nozzle openings 28 as shown by the arrows 70. As the consumable electrode is fed through the guide means 56, a certain amount of atmospheric gases accompanies and is forced down with the consumable electrode. To prevent the plasma from being adversely affected by the atmospheric gas, a portion of the gas coming from conduits 50 and 52 is forced up the guide means 56, thus creating a back-pressure as seen by the arrows 72.

In order that the nozzle may be cooled all the way to its tip, the chamber 40 is located adjacent, and in direct contact with, the heat conductive portions of the nozzle. The annular recess 32 in flange 30 also brings the cooling a little bit closer to the nozzle openings. The cooling fluid is conveyed into the cooling chamber 42 by means of fluid-conveying means in the form of a tube 46 and down through opening 42 in the second flange 36. The cooling fluid is exhausted or removed from the cooling chamber through opening 44 and flange 36 and out through the conduit 48.

It is readily apparent that the entire nozzle device may be easily dismantled. The skirt 18 and tube 20 are merely slid off over the sealing rings 34 and 36. The contact tip 22 may be unscrewed from the nozzle body 24 by means of threads 26. The first flange 30 which is either of a plastic or metal construction, depending upon the type of welding being done, is readily changeable since it is threadedly secured to the body 24.

As discussed above, by means of this construction, there is cooling provided adjacent the gas nozzle, thereby enabling working at a higher current with a smaller gun. Also by means of the back pressure on the air coming in through the guide means, the plasma is not contaminated. Therefore, the same gun can be used for short arc and spray arc processes and is easily manipulated for any of these processes.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. An electric arc welding gun for use with a consumable electrode comprising:
    (a) a barrel,
    (b) a nozzle at one terminal of said barrel,
    (c) a gas conveying tube within said barrel,
    (d) an electrode guiding tube within, and in spaced relation to, the walls of said gas conveying tube,
    (e) a tubular nozzle portion connected to a terminal of said gas conveying tube,
    (f) said nozzle portion being spaced from said electrode guiding tube to permit passage of gas therebetween,
    (g) a contact tip having a bore through which the electrode passes, connected to the terminal of said nozzle portion remote from said gas conveying tube,
    (h) means for feeding said gas from said gas conveying tube to the area of said barrel nozzle surrounding said contact tip, and
    (i) means for directing a portion of the gas into the terminal of said electrode guiding tube to create a back pressure for preventing air from entering the nozzle area through said electrode guiding tube.

2. The arc welding gun of claim 1, with the addition of:
    (a) a cooling chamber surrounding said electrode guiding tube.

3. The arc welding gun of claim 2, wherein:
    (a) said cooling chamber is formed by a pair of spaced fingers extending outwardly from said nozzle portion,
    (b) an inlet and outlet in one of said flanges in communication with said cooling chamber, and
    (c) means for feeding cooling fluid to said inlet and from said outlet.

4. The arc welding gun of claim 1, wherein:
    (a) said contact tip is proximate, but spaced from, a terminal of said electrode guiding tube to provide a space into which gas from the gas conveying tube passes,
    (b) the size of the opening of said contact tip being reduced to create a substantial back pressure of gas in said electrode guiding tube and prevent air from entering the nozzle area through said electrode guiding tube.

5. An electric arc welding gun for use with a consumable electrode comprising:
    (a) a barrel,
    (b) a nozzle at one terminal of said barrel,
    (c) a gas conveying tube within said barrel,
    (d) an electrode guiding tube within, and in spaced relation to, the walls of said gas conveying tube,
    (e) a main nozzle portion located at a terminal of said gas conveying tube,
    (f) said nozzle portion having a longitudinal bore for the reception of the terminal portion of said electrode guiding tube,
    (g) the inner periphery of said nozzle portions being spaced from the outer periphery of said electrode guiding tube to form a passageway in communication with a terminal of said gas conveying tube, to provide a back pressure of gas in said electrode guiding tube and preventing air from entering the nozzle area through said electrode guiding tube,
    (h) said nozzle portion being further provided with a series of radial openings in communication with said passageway, for permitting passage of gas to said barrel nozzle, and
    (i) a contact tip secured to a terminal of said nozzle portion,
    (j) said contact tip being provided with a longitudinal bore through which the electrode passes from said electrode guiding tube.

6. The electric arc welding gun of claim 5, wherein:
    (a) said contact tip is proximate, but spaced from, a terminal of said electrode guiding tube to provide a space into which gas from the gas conveying tube passes,
    (b) the size of the bore of said contact tip being reduced to create a substantial back pressure of gas in said electrode guiding tube and prevent air from entering the nozzle area through said electrode guiding tube.

7. The electric arc welding gun of claim 5, with the addition of:

(a) a pair of spaced flanges extending outwardly from said nozzle portion into sealing engagement with said barrel, to form a cooling chamber, and
(b) means for directing a cooling fluid to and from said cooling chamber.

References Cited

UNITED STATES PATENTS

| | | | |
|---|---|---|---|
| 2,777,928 | 1/1957 | Bernard | 219—130 |
| 2,827,549 | 3/1958 | Carlson | 219—130 |
| 2,965,746 | 12/1960 | Cresswell | 219—130 X |
| 3,270,179 | 8/1966 | Russell | 219—74 |
| 3,283,121 | 11/1966 | Bernard et al. | 219—130 |
| 3,350,535 | 10/1967 | Simon | 219—130 X |

JOSEPH V. TRUHE, Primary Examiner
C. L. ALBRITTON, Assistant Examiner

U.S. Cl. X.R.
219—74